(12) United States Patent
Hotta et al.

(10) Patent No.: US 8,339,922 B2
(45) Date of Patent: Dec. 25, 2012

(54) OPTICAL PICKUP APPARATUS

(75) Inventors: Tohru Hotta, Nagano (JP); Ryoichi Kawasaki, Gunma (JP); Tetsuhisa Hosokawa, Aichi (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 145 days.

(21) Appl. No.: 12/371,109

(22) Filed: Feb. 13, 2009

(65) Prior Publication Data

US 2009/0290475 A1    Nov. 26, 2009

(30) Foreign Application Priority Data

Feb. 15, 2008  (JP) ................. 2008-034039
Dec. 19, 2008  (JP) ................. 2008-323079

(51) Int. Cl.
  *G11B 7/135*  (2012.01)
  *G11B 7/20*   (2011.01)
(52) U.S. Cl. .................... 369/112.03; 369/94
(58) Field of Classification Search ............ 369/112.03, 369/112.16, 112.19
  See application file for complete search history.

(56) References Cited

U.S. PATENT DOCUMENTS

| | | | | |
|---|---|---|---|---|
| 5,892,749 A | * | 4/1999 | Yamanaka | 369/112.17 |
| 2008/0037387 A1 | * | 2/2008 | Park et al. | 369/44.23 |
| 2008/0049581 A1 | * | 2/2008 | Kim et al. | 369/112.01 |

FOREIGN PATENT DOCUMENTS

| JP | 11-023960 | 1/1999 |
|---|---|---|
| JP | 2006-172605 | 6/2006 |

* cited by examiner

*Primary Examiner* — Joseph Haley
*Assistant Examiner* — Nicholas Lee
(74) *Attorney, Agent, or Firm* — Fish & Richardson P.C.

(57) ABSTRACT

An optical pickup apparatus comprising: a diffraction grating configured to diffract laser light from a laser diode so that signals recorded in first and second optical discs are selectively reproduced, thicknesses of protective layers between surfaces and signal recording surfaces of the first and second optical discs being different from each other; a polarization beam splitter configured to divide laser light from the diffraction grating into first and second laser lights whose light amounts are substantially the same; a first objective lens configured to focus the first laser light onto the signal recording surface of the first optical disc; a second objective lens configured to focus the second laser light onto the signal recording surface of the second optical disc; and a photodetector configured to be applied with return lights of the first and second laser lights reflected from the signal recording surfaces of the first and second optical discs.

6 Claims, 7 Drawing Sheets

OPTICAL PICKUP APPARATUS

CROSS-REFERENCE TO RELATED APPLICATIONS

This application claims the benefit of priority to Japanese Patent Application Nos. 2008-34039 and 2008-323079, filed Feb. 15, 2008 and Dec. 19, 2008, respectively, of which full contents are incorporated herein by reference.

BACKGROUND OF THE INVENTION

1. Field of the Invention

The present invention relates to an optical pickup apparatus that performs an operation of reading a signal recorded in an optical disc or an operation of recording a signal in the optical disc.

2. Description of the Related Art

There is known an optical disc device capable of a signal reading operation and signal recording operation by applying laser light emitted from an optical pickup apparatus to a signal recording layer of an optical disc.

The optical disc devices using optical discs called CDs or DVDs are known in general, however, optical discs whose recording densities are improved, that is, those using Blu-ray standard or HD DVD (High Density Digital Versatile Disc) standard optical discs have recently been developed.

Infrared light with a wavelength of 780 nm is used as the laser light performing the operation of reading a signal recorded in a CD standard optical disc, and red light with a wavelength of 650 nm is used as the laser light performing the operation of reading a signal recorded in a DVD standard optical disc.

A protective layer provided between an upper surface of the signal recording layer, that is, the signal recording layer, and a surface on which the laser light is incident, has a thickness of 1.2 mm in the CD standard optical disc; and the numerical aperture of an objective lens used for the operation of reading a signal from this signal recording layer is specified to 0.45. A protective layer provided on the upper surface of the signal recording layer has a thickness of 0.6 mm in the DVD standard optical disc, and the numerical aperture of the objective lens used for the operation of reading a signal from this signal recording layer is specified to 0.6.

In contrast to cases of such CD-standard and DVD-standard optical discs, laser light with a short wavelength, e.g., blue-violet light with a wavelength of 405 nm, is used as the laser light performing the operation of reading a signal recorded in the Blu-ray standard or HD DVD standard optical discs.

A protective layer provided on an upper surface of a signal recording layer has a thickness of 0.1 mm in the Blu-ray standard optical disc, and the numerical aperture of the objective lens used for the operation of reading a signal from this signal recording layer is specified to 0.85.

On the other hand, a protective layer provided on an upper surface of a signal recording layer has a thickness of 0.6 mm in the HD DVD standard optical disc, and the numerical aperture of the objective lens used for the operation of reading a signal from the signal recording layer is specified to 0.65.

As mentioned above, since the blue-violet light with a wavelength of 405 nm can be used as the laser light for performing the operation of reading a signal recorded in the Blu-ray standard or HD DVD standard optical disc, an optical pickup apparatus capable of performing the operations of reading signals from the optical discs of both standards can be made by sharing the same laser diode therebetween.

However, in order to read signals from both optical discs, the locations of their signal recording layers are greatly different from each other and the required numerical apertures of the objective lenses are also greatly different, and thus, it is necessary to switch the numerical aperture according to the optical disc, and an optical pickup apparatus capable of such an operation has been developed (See Japanese Patent Laid-Open Publication No. 2006-172605).

Such optical disc devices that can use not only the above-mentioned CD standard and DVD standard optical discs but also Blu-ray standard and HD DVD standard optical discs have recently been commercialized. Optical pickup apparatuses used in such optical disc devices are naturally configured to be able to perform an operation of reading a signal from a signal recording layer provided on an optical disc of a usable standard or an operation of recording a signal in the signal recording layer.

In such an optical pickup apparatus, since it is difficult to apply laser light with the above-mentioned wavelengths to the signal recording layers of the optical discs with a single objective lens, two objective lenses are used which are an objective lens for applying the laser light to the CD standard and DVD standard optical discs, for example, and an objective lens for applying the laser light to the Blu-ray standard optical disc, for example, (See Japanese Patent Laid-Open Publication No. Heill-23960).

As mentioned above, since the blue-violet light with a wavelength of 405 nm can be used as the laser light for performing the operation of reading a signal recorded in the Blu-ray standard or HD DVD standard optical disc, the optical pickup apparatus that can perform the operations of reading signals from the optical discs of both standards can be made by sharing the same laser diode therebetween.

In such optical discs of the above standards, not only that the thicknesses of the protective layers are different therebetween, but also the numerical apertures of the objective lenses are different, and thus, the optical pickup apparatus using two objective lenses respectively corresponding to the optical discs in the above standards has been developed.

In the optical pickup apparatus including the two objective lenses, a first objective lens and a second objective lens are fixed onto a lens holder supported so as to be capable of moving in a signal-surface direction of an optical disc and a radial direction of the optical disc by means of a supporting wire, and are configured so that a focus control operation for focusing the laser light as a spot onto the signal recording layer included in the optical disc and a tracking control operation for making the spot follow a signal track provided in the signal recording layer are performed by a movement operation of the lens holder.

A configuration is made such that the focus control operation and the tracking control operation in the optical pickup apparatus are performed by applying to a photodetector laser light called return light reflected from the signal recording layer included in the optical disc and by using a focus error signal or a tracking error signal obtained from the photodetector.

The optical pickup apparatus including the two objective lenses is configured such that the focus error signal and the tracking error signal are generated for each of the optical discs through applying to the photodetector the return light obtained from each of the objective lenses, and in the optical pickup apparatus configured such that the photodetector is shared, there is a problem that if a mounting position of the photodetector is determined so that that the position is suitable for the return light obtained from one of the objective lenses, it is not an optimal position for the return light obtained from the other one of the objective lenses.

Moreover, an optical element called polarization beam splitter is used for dividing the laser light emitted from a single laser diode to be separately guided to the first objective lens and the second objective lens, and a configuration is made such that the above dividing operation by the polarization beam splitter is performed through polarizing the laser light.

That is, a configuration is made such that in the case of an operation of reproducing a signal recorded in a first optical disc with the laser light focused by the first objective lens, the laser light of P-polarized light, which is linearly polarized light, is made to enter the polarization beam splitter, for example, so as to be passed through or reflected by a control film included in the polarization beam splitter in a direction of the first objective lens, while in the case of an operation of reproducing a signal recorded in a second optical disc with the laser light focused by the second objective lens, S-polarized light, which is linearly polarized light whose polarization direction is different by 90 degrees, is made to enter the polarization beam splitter so as to be reflected by or passed through the control film included in the polarization beam splitter in a direction of the second objective lens.

The optical pickup apparatus with the above configuration is configured so as to perform conversion into the P-polarized light or S-polarized light with a half-wave plate provided between the laser diode and the polarization beam splitter. A control element for performing such a polarization operation is expensive and increase in cost of the optical pickup apparatus is incurred, which is a problem.

SUMMARY OF THE INVENTION

An optical pickup apparatus according to an aspect of the present invention, comprises: An optical pickup apparatus comprising: a diffraction grating configured to diffract laser light from a laser diode so that a signal recorded in a first optical disc and a signal recorded in a second optical disc are selectively reproduced, a thickness of a protective layer between a surface and a signal recording surface of the first optical disc being different from a thickness of a protective layer between a surface and a signal recording surface of the second optical disc; a polarization beam splitter configured to divide laser light from the diffraction grating into first laser light and second laser light whose light amounts are substantially the same; a first objective lens configured to focus the first laser light onto the signal recording surface of the first optical disc; a second objective lens configured to focus the second laser light onto the signal recording surface of the second optical disc; and a photodetector configured to be applied with return light of the first laser light reflected from the signal recording surface of the first optical disc and return light of the second laser light reflected from the signal recording surface of the second optical disc.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
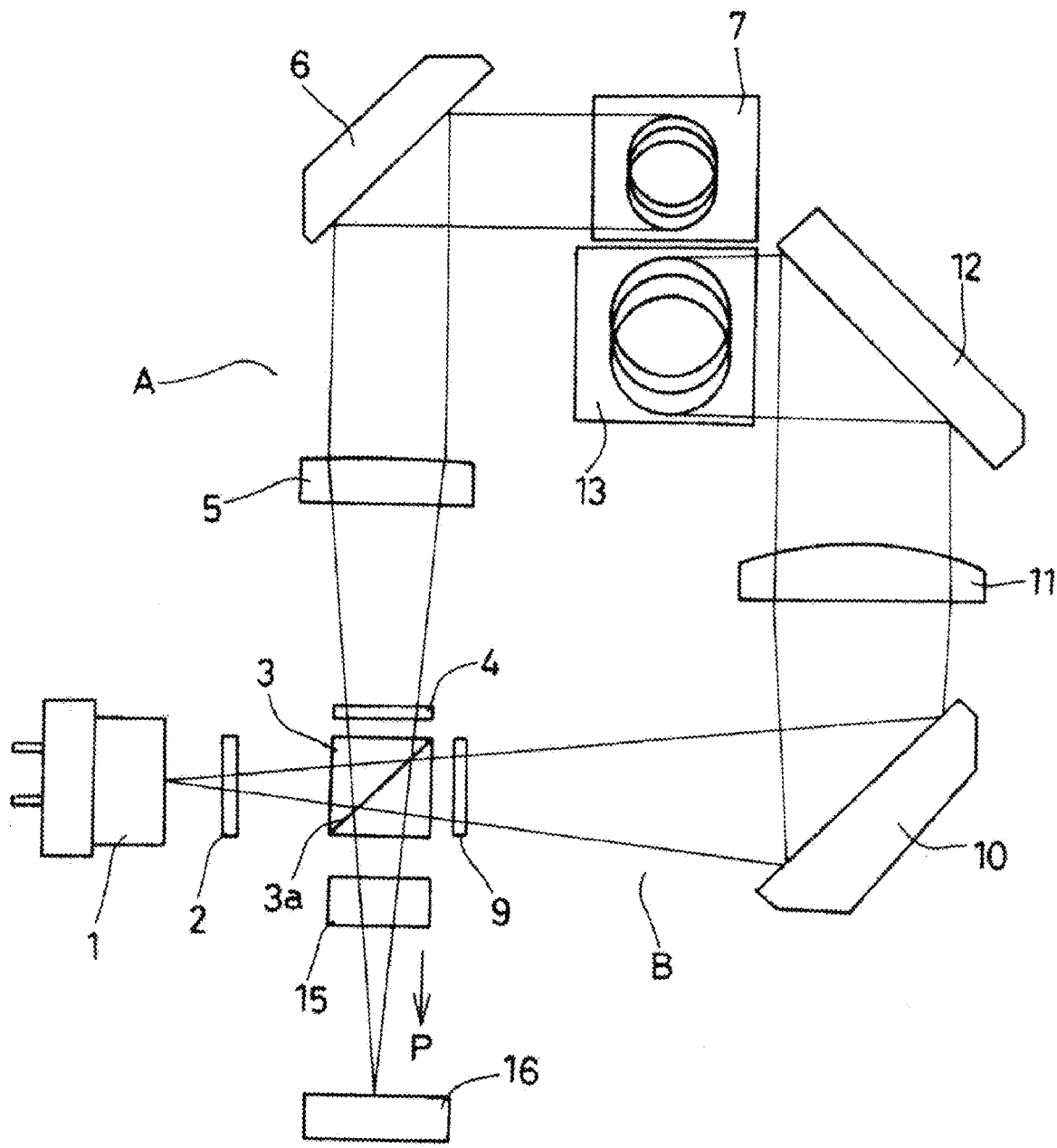
FIG. 1 is a diagram illustrating an optical system of an optical pickup apparatus according to an embodiment of the present invention.

At least the following details will become apparent from descriptions of this specification and of the accompanying drawings.

An optical pickup apparatus according to an embodiment of the present invention, which is capable of performing operations of reproducing signals recorded in a first optical disc and a second optical disc including protective layers each different in thickness from other, each provided between a signal recording layer (signal recording surface) and a surface on which laser light is incident, includes: a polarization beam splitter that the laser light emitted from a laser diode enters and that divides the incident laser light in a direction of a first optical system and a direction of a second optical system; a diffraction grating that is provided between the laser diode and the polarization beam splitter and that divides the laser light into a main beam and sub beams; a first objective lens that is included in the first optical system and that focuses the laser light onto the signal recording layer included in a first optical disc; a second objective lens that is included in the second optical system and that focuses the laser light onto the signal recording layer included in the second optical disc; and a photodetector that is provided at a position where return light reflected from the signal recording layer of the first optical disc and the return light reflected from the signal recording layer of the second optical disc are applied and that includes a main-beam light receiving portion (first light-receiving portion) to which the return light of the main beam is applied and a sub-beam light receiving portion (second light-receiving portion), and wherein the dividing ratio of laser light amounts divided between the first optical system and the second optical system by the polarization beam splitter is made equal. Therefore, there is no need to provide an optical element for selectively changing the polarization direction between the laser diode and the polarization beam splitter, and thus, the cost of the optical pickup apparatus can be reduced.

In the optical pickup apparatus according to an embodiment of the present invention, the laser light divided to be emitted by the polarization beam splitter in a direction of the first optical system and a direction of the second optical system is made into linearly polarized light with polarization directions different from each other.

In the optical pickup apparatus according to an embodiment of the present invention, the first objective lens included in the first optical system and the second objective lens included in the second optical system are fixed onto the same lens holder.

In the optical pickup apparatus according to an embodiment of the present invention, a collimating lens for converting the laser light into parallel light is included in one of the first optical system and the second optical system, and a reflection mirror for reflecting the laser light is provided in an optical path of the parallel light having been converted by the collimating lens so that phases of the main beam and the sub beam are adjusted by adjusting an angle of the reflection mirror. Therefore, position adjustment for the first optical system and the second optical system can accurately be performed.

In the optical pickup apparatus according to an embodiment of the present invention, the angle of the reflection mirror included in the first optical system is adjusted.

In the optical pickup apparatus according to an embodiment of the present invention, the angle of the reflection mirror is adjusted after the position of the photodetector is adjusted for the second optical system.

In the optical pickup apparatus according to an embodiment of the present invention, the operation of reproducing a signal recorded in the optical disc with the protective layer having smaller thickness is performed in the first optical system.

In an embodiment of the present invention, there will be described an optical pickup apparatus that can be used for a Blu-ray standard optical disc (first optical disc D1) and an HD DVD standard optical disc (second optical disc D2).

In FIG. 1, reference numeral 1 denotes a laser diode for emitting laser light with a wavelength of 405 nm, that is, blue-violet light, and it is configured to emit linearly polarized light in an S direction in an embodiment of the present invention. Reference numeral 2 denotes a diffraction grating that the laser light emitted from the laser diode 1 enters, and that divides the laser light into a main beam, which is 0th order light, and sub beams, which are +1st order diffracted light and −1st order diffracted light.

Reference numeral 3 denotes a polarization beam splitter that the laser light having passed through the diffraction grating 2 enters and that includes a control film 3a which reflects 50% of the incident light amount as laser light of a first optical system A (first laser light) and which allows the remaining 50% thereof to pass therethrough as laser light of a second optical system B (second laser light). The control film 3a is made up so as to reflect the laser light emitted from the laser diode 1 as S-polarized light in a direction of the first optical system A, and so as to allow the laser light to pass therethrough as the P-polarized light in a direction of the second optical system B. Moreover, the control film 3a is made up so as to allow 100% of the P-polarized light to pass therethrough, which is incident as return light from the first optical system A, and so as to reflect 100% of the S-polarized light, which is incident as the return light from the second optical system B.

Reference numeral 4 denotes a first-optical system quarter-wave plate that the laser light reflected by the control film 3a included in the polarization beam splitter 3 and the return light reflected from a signal recording layer L1 included in the first optical disc D1 enter, and that is included in the first optical system A, and it converts the incident laser light from the linearly polarized light into circularly polarized light, or to the contrary, from the circularly polarized light to the linearly polarized light.

Reference numeral 5 denotes a first collimating lens that the laser light having passed through the first-optical system quarter-wave plate 4 enters, that is included in the first optical system A, and that is made up so as to convert the incident laser light to the parallel light and to be adjusted and fixed at an optimal position for correcting a spherical aberration caused by a protective layer of the first optical disc D1.

Figure 2:
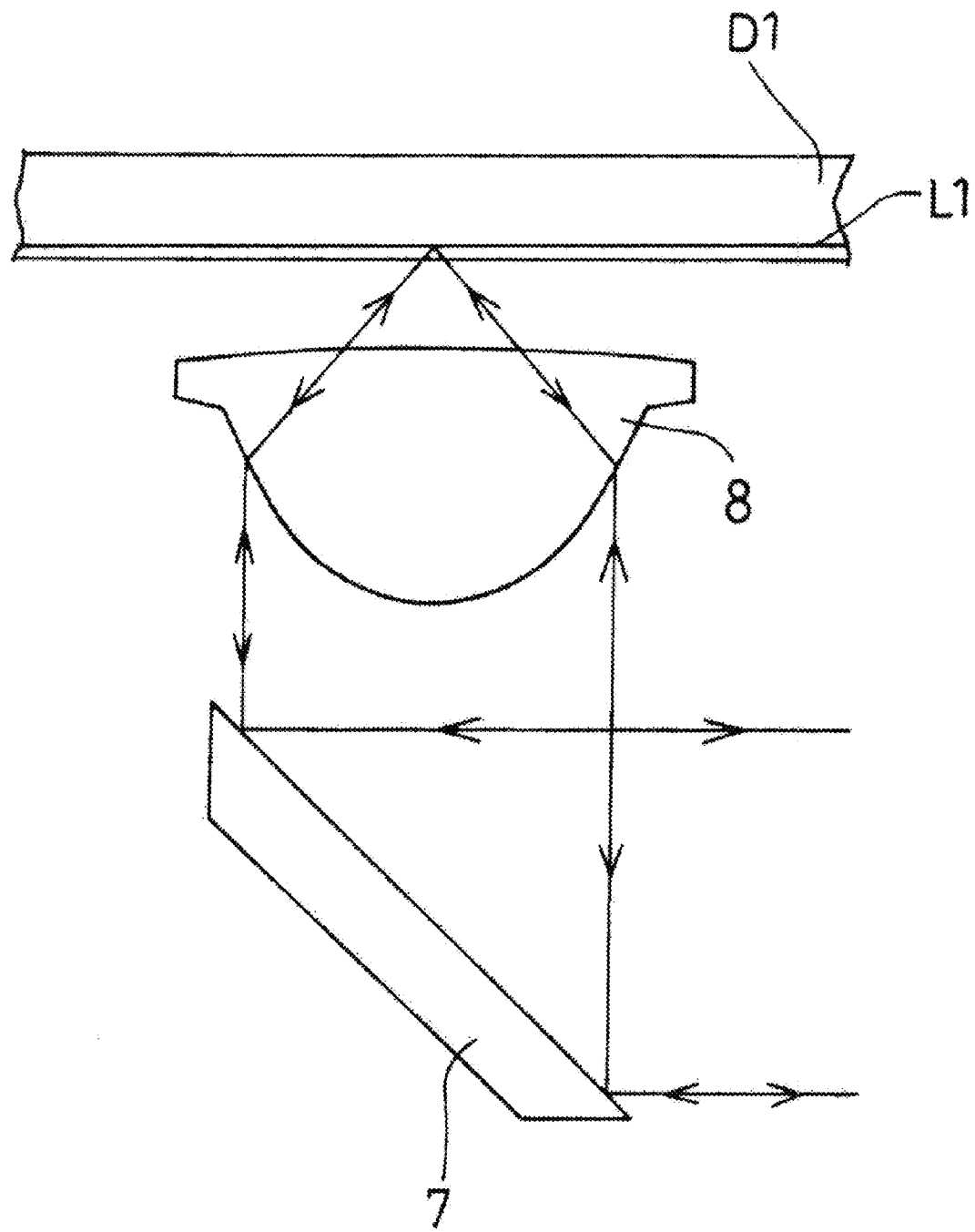
FIG. 2 is a diagram illustrating a relationship between an optical disc and an optical system according to an embodiment of the present invention.

Reference numeral 6 denotes a first reflection mirror that the laser light having been converted into the parallel light by the collimating lens 5 is incident on and that reflects the laser light, and is provided so as to be capable of adjusting a flap angle in order to adjust phase difference between the main beam, which is the 0th order light, and the sub beams, which are ±1 order diffracted lights, as will be described later. Reference numeral 7 denotes a first raising mirror that the laser light reflected by the first reflection mirror 6 enters, and reflects the laser light in a direction of the first objective lens 8 which is provided so as to focus the light onto the signal recording layer L1 included in the first optical disc D1 as illustrated in FIG. 2.

As mentioned above, the first optical system A acting when the first optical disc D1 is used includes the first-optical system quarter-wave plate 4, the first collimating lens 5, the first reflection mirror 6, the first raising mirror 7, and the first objective lens 8.

Reference numeral 9 denotes a second-optical system quarter-wave plate that the laser light having passed through the control film 3a included in the polarization beam splitter 3 and the return light reflected from a signal recording layer L2 included in the second optical disc D2 enter, and that is included in the second optical system B, and it acts to convert the incident laser light from the linearly polarized light into the circularly polarized light, or to the contrary, from the circularly polarized light into the linearly polarized light.

Reference numeral 10 denotes a second reflection mirror that the laser light having passed through the second-optical system quarter-wave plate 9 enters, and that is included in the second optical system B, and reference numeral 11 is a second collimating lens that the laser light reflected by the second reflection mirror 10 enters, and it is configured to convert the incident laser light into the parallel light and to be adjusted and fixed at an optimal position for correcting the spherical aberration caused by the protective layer of the second optical disc D2.

Figure 3:
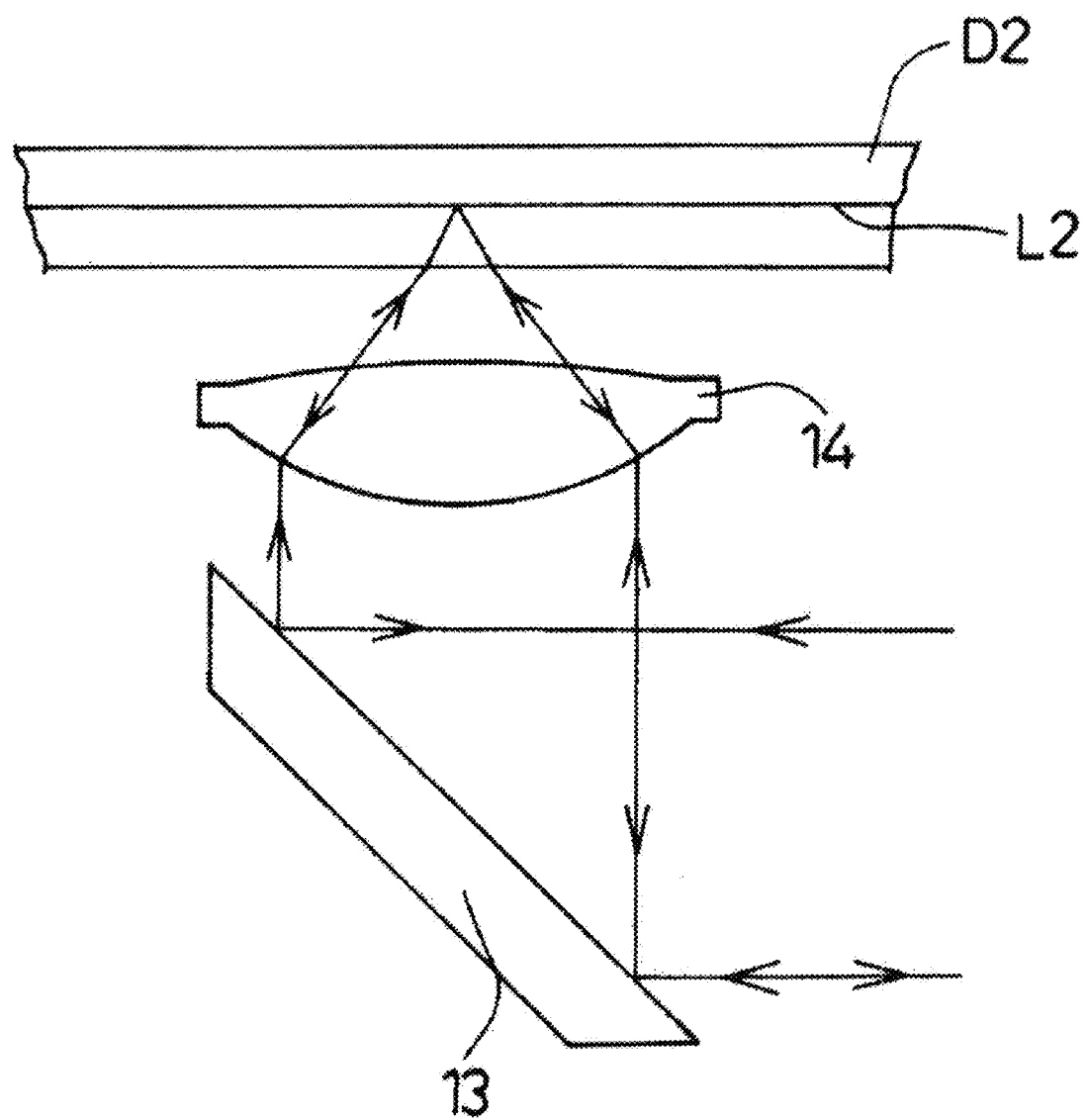
FIG. 3 is a diagram illustrating another relationship between an optical disc and an optical system according to an embodiment of the present invention.

Reference numeral 12 is a third reflection mirror that the laser light converted into the parallel light by the second collimating lens 11 enters, and that reflects the laser light, and reference numeral 13 denotes a second raising mirror that the laser light reflected by the third reflection mirror 12 enters, and it acts to reflect the laser light in a direction of the second objective lens 14 provided so as to focus the light onto the signal recording layer L2 included in the second optical disc D2 as illustrated in FIG. 3.

As mentioned above, the second optical system B acting when the second optical disc D2 is used includes the second-optical system quarter-wave plate 9, the second reflection mirror 10, the second collimating lens 11, the third reflection mirror 12, the second raising mirror 13, and the second objective lens 14.

Figure 5:
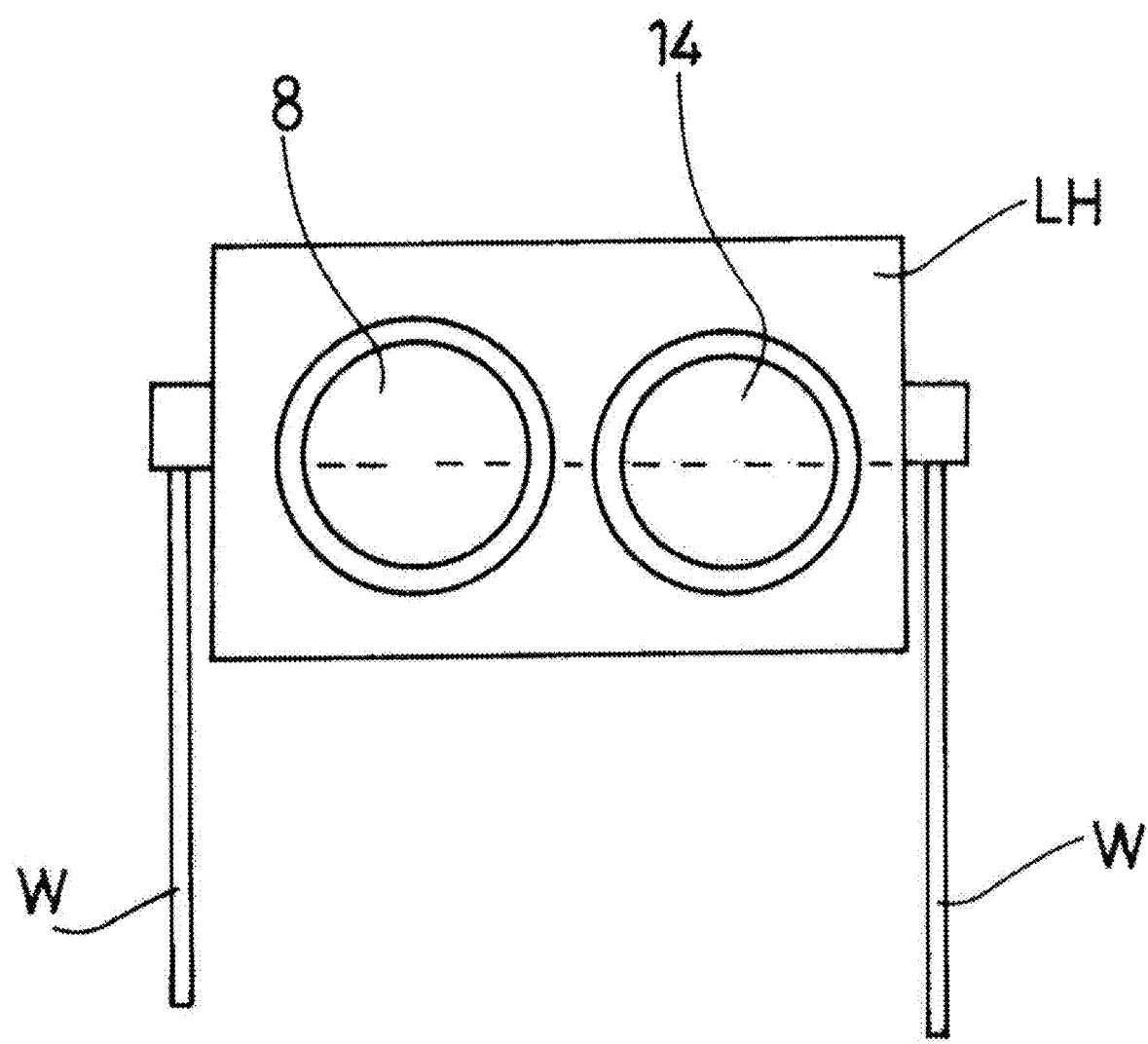
FIG. 5 is a plan view illustrating a lens holder to which an objective lens is fixed.

The first optical system A and the second optical system B are made up as mentioned above, and the first objective lens 8 and the second objective lens 14 are fixed such that a direction of a line connecting center axes of the lenses (shown by a broken line) matches the radial direction of the optical disc on the same lens holder LH as illustrated in FIG. 5. Also, the lens holder LH to which the first objective lens 8 and the second objective lens 14 are fixed is made up so as to be movable in the focus direction, which is a signal surface direction of the optical disc, and the tracking direction, which is the radial direction of the optical disc, with four supporting wires W.

In such a configuration, the laser light focused onto the signal recording layer L1 of the first optical disc D1 by the first objective lens 8 included in the first optical system A is reflected as return light from the signal recording layer L1, to enter the first objective lens 8. As above, the return light incident on the first objective lens 8 enters the polarization beam splitter 3 through the first raising mirror 7, the first reflection mirror 6, the first collimating lens 5, and the first-optical system quarter-wave plate 4.

Since the return light incident on the polarization beam splitter 3 from the first optical system A as above has been converted by the first optical quarter-wave plate 4 from the circularly polarized light to the linearly polarized light in the P direction, the light passes through the control film 3a included in the polarization beam splitter 3 to be emitted in a direction of an arrow P.

Moreover, in such a configuration, the laser light focused onto the signal recording layer L2 of the second optical disc D2 by the second objective lens 14 included in the second optical system B is reflected as the return light from the signal recording layer L2 to enter the second objective lens 14. As above, the return light incident onto the second objective lens 14 enters the polarization beam splitter 3 through the second raising mirror 13, the third reflection mirror 12, the second collimating lens 11, the second reflection mirror 10, and the second-optical system quarter-wave plate 9.

Since the return light from the second optical system B incident on the polarization beam splitter 3 as above has been converted by the second optical system quarter-wave plate 9 from the circularly polarized light to the linearly polarized light in the S direction, the light is reflected by the control film 3a included in the polarization beam splitter 3, to be emitted in the direction of the arrow P.

Reference numeral 15 denotes an anamorphic lens that the laser light, which is the return light from the first optical system A having passed through the control film 3a included in the polarization beam splitter 3, and the laser light, which is the return light from the second optical system B reflected by the control film 3a, enter, and it has a cylindrical face, a flat face, a concave face or a convex face, etc., formed on an incident surface side and an outgoing surface side.

Figure 4:
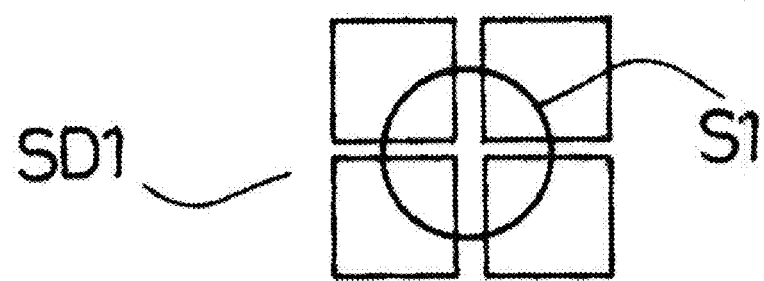
FIG. 4 is an explanatory diagram illustrating a relationship between a photodetector and an irradiation spot according to an embodiment of the present invention.
Figure 4:
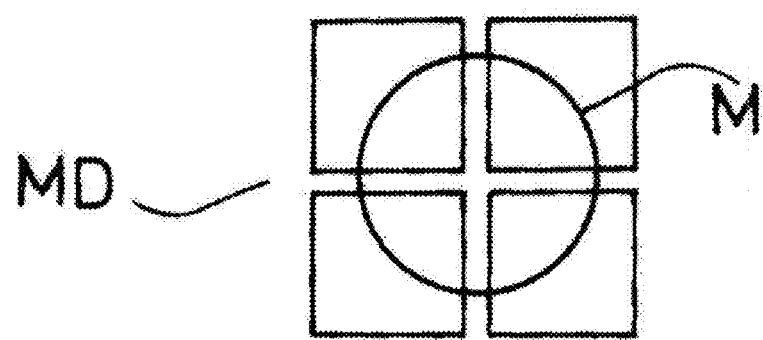
Figure 4:
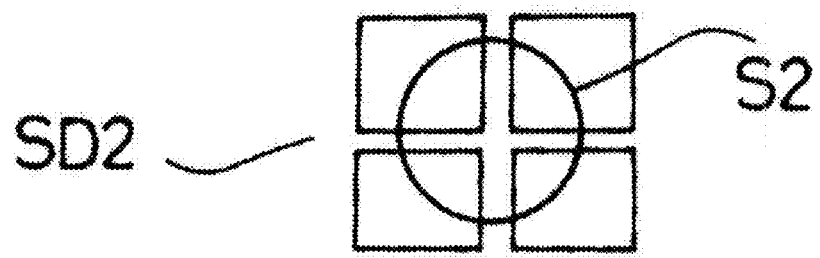

The anamorphic lens 15 as above is provided in order to generate a focus error signal used in the focus control operation by causing astigmatism in the return light. Reference numeral 16 is a photodetector that is provided at a position where the return light having passed through the anamorphic lens 15 is focused to be applied, and that includes a four-divided sensor, etc., in which a plurality of photodiodes are arranged as illustrated in FIG. 4. A structure of the four-divided sensor included in the photodetector 16 and a generation operation and the like of the focus error signal by the astigmatism method are known, and the description thereof will be omitted.

The optical system of the optical pickup apparatus according to an embodiment of the present invention is made up as mentioned above, and there will hereinafter be described the operation of reading a signal in the optical pickup apparatus with the above configuration.

When the first optical disc D1 is used, a positional relationship between a position of the signal recording layer L1 included in the first optical disc D1 and the first objective lens 8 is in a state illustrated in FIG. 2. When such a first optical disc D1 is used, a driving current is supplied to the laser diode 1, so that blue-violet laser light is emitted from the laser diode 1.

The laser light emitted from the laser diode 1 enters the diffraction grating 2, and is divided into the main beam, which is the 0th order light, and the sub beams, which are the +1st order diffracted light and the −1st order diffracted light, to enter the polarization beam splitter 3. When the laser light enters the polarization beam splitter 3, 50% of the light amount is reflected by the control film 3a included in the polarization beam splitter 3 in a direction of the first optical system A as the S-polarized light, while 50% of the light amount is passed therethrough in a direction of the second optical system B as the P-polarized light.

The laser light reflected by the control film 3a enters the first-optical system quarter-wave plate 4 to be converted from the linearly polarized light, which is the S-polarized light, to the circularly polarized light, and then, the converted light enters the first collimating lens 5. The laser light incident on the first collimating lens 5 is converted into the parallel light by an action of the first collimating lens 5. The laser light converted into the parallel light by the first collimating lens 5 is reflected by the first reflection mirror 6, to enter the first raising mirror 7.

The laser light incident on the first raising mirror 7 is reflected in a direction perpendicular to an incident direction as illustrated in FIG. 2, to enter the first objective lens 8. The laser light incident on the first objective lens 8 is applied as a spot to the signal recording layer L1 of the first optical disc D1 through a focusing operation of the first objective lens 8. The laser light emitted from the laser diode 1 is applied to the signal recording layer L1 of the first optical disc D1 as a desired spot as above, and the numerical aperture of the first objective lens 8 in this case is set to be 0.85.

An irradiation operation with the laser light to the signal recording layer L1 included in the first optical disc D1 is performed through the above-mentioned operation, and when the irradiation operation is performed, the return light reflected from the signal recording layer L1 enters the first objective lens 8 from the first optical disc D1 side. The return light incident on the first objective lens 8 enters the polarization beam splitter 3 through the first raising mirror 7, the first reflection mirror 6, the first collimating lens 5, and the first-optical system quarter-wave plate 4. Since the return light incident on the polarization beam splitter 3 has been converted into the linearly polarized light in the P direction, the light is passed through the control film 3a included in the polarization beam splitter 3.

The return light from the first optical system A having passed through the control film 3a enters the anamorphic lens 15 so that the astigmatism is caused by an action of the anamorphic lens 15. The return light with the astigmatism caused by the anamorphic lens 15 is applied to a sensor portion of the four-divided sensor, etc., included in the photodetector 16 by the focusing operation of the anamorphic lens 15. FIG. 4 illustrates a relationship between the four-divided sensor included in the photodetector 16 and a laser spot; and there are arranged a main-beam light receiving portion MD (first light-receiving portion), to which a main beam M is applied, and sub-beam light receiving portions SD1 and SD2 (second light-receiving portions), to which sub beams S1 and S2 are applied, as illustrated in the figure.

As a result of the return light being applied to the photodetector 16 as above, using a change in shape of each of the spots applied to the main-beam light receiving portion MD and the sub-beam light receiving portions SD1 and SD2 included in the photodetector 16, operations of generating the focus error signal and the tracking error signal are performed as known. The focus control operation can be performed by moving the first objective lens 8 in a direction perpendicular to the signal surface of the first optical disc D1 using the focus error signal, and the tracking control operation can be performed by moving the first objective lens 8 in the radial direction of the first optical disc D1 using the tracking error signal.

There are known the focus control operation by the astigmatism method and a differential astigmatism method using the focus error signal and the tracking error signal obtained from the main-beam light receiving portion MD and the sub-beam light receiving portions SD1 and SD2 included in the photodetector 16, and the tracking control operation by a three-beam method, and thus, the description thereof will be omitted.

As mentioned above, there is performed an operation when the first optical disc D1 is used, that is, an operation when the first optical system A included in the optical pickup apparatus is used, and there will hereinafter be described an operation when the second optical disc D2 is used, that is, an operation when the second optical system B is used.

When the second optical disc D2 is used, a positional relationship between a position of the signal recording layer L2 included in the second optical disc D2 and the second objective lens 14 is in a state illustrated in FIG. 3. When the second optical disc D2 is used, a driving current is supplied to the laser diode 1 as is the case with the first optical disc D1, and the blue-violet laser light is emitted from the laser diode 1.

The laser light emitted from the laser diode 1 enters the diffraction grating 2, and is divided into the main beam, which is the 0th order light, and the sub beams, which are the +1st order diffracted light and the −1st order diffracted light, to enter the polarization beam splitter 3. When such laser light enters the polarization beam splitter 3, 50% of the light amount is passed through the control film 3a included in the polarization beam splitter 3 as the P-polarized light, to be emitted in the direction of second optical system B.

Moreover, in the above case as well, 50% of the light amount is reflected by the control film 3a included in the polarization beam splitter 3 in the direction of the first optical system A as the S-polarized light.

The laser light having passed through the control film 3a enters the second-optical system quarter-wave plate 9 and is converted from the linearly polarized light to the circularly polarized light, to be applied to the second reflection mirror 10. The laser light applied to the second reflection mirror 10 is reflected by the second reflection mirror 10, to enter the second collimating lens 11. The laser light incident on the second collimating lens 11 is converted into the parallel light by an action of the second collimating lens 11. The laser light having been converted into the parallel light by the second collimating lens 11 is reflected by the third reflection mirror 12, to enter the second raising mirror 13.

The laser light incident on the second raising mirror 13 is reflected to enter the second objective lens 14 as illustrated in FIG. 3. The laser light incident on the second objective lens 14 is applied as a spot to the signal recording layer L2 of the second optical disc D2 through a focusing operation of the second objective lens 14. The laser light emitted from the laser diode 1 is applied to the signal recording layer L2 of the second optical disc D2 as a desired spot as above, and the numerical aperture of the second objective lens 14 in this case is set to be 0.65

The irradiation operation with the laser light to the signal recording layer L2 included in the second optical disc D2 is performed through the above-mentioned operation, and when the irradiation operation is performed, the return light reflected from the signal recording layer L2 enters the second objective lens 14 from the second optical disc D2 side. The return light incident on the second objective lens 14 enters the polarization beam splitter 3 through the second raising mirror 13, the third reflection mirror 12, the second collimating lens 11, the second reflection mirror 10, and the second-optical system quarter-wave plate 9. Since the return light incident on the polarization beam splitter 3 has been converted into the linearly polarized light in the S direction, the light is reflected by the control film 3a included in the polarization beam splitter 3.

The return light from the second optical system B reflected by the control film 3a enters the anamorphic lens 15, so that the astigmatism is caused by the action of the anamorphic lens 15. The return light with the astigmatism caused by the anamorphic lens 15 is applied to the sensor portion of the four-divided sensor etc., included in the photodetector 16 by the focusing operation of the anamorphic lens 15, as is the case with the return light from the first optical system A.

As a result of the return light being applied to the photodetector 16 as above, using a change in shape of each of the spots applied to the main-beam light receiving portion MD and the sub-beam light receiving portions SD1 and SD2 included in the photodetector 16, the operations of generating the focus error signal and the tracking error signal are performed as mentioned above. The focus control operation can be performed by moving the second objective lens 14 in a direction perpendicular to the signal surface of the second optical disc D2 using the focus error signal, and the tracking control operation can be performed by moving the second objective lens 14 in the radial direction of the second optical disc D2 using the tracking error signal.

As mentioned above, there are performed the operations of the optical pickup apparatus when the first optical disc D1 and the second optical disc D2 are used in an embodiment of the present invention, and a configuration is made such that the laser light emitted from the laser diode 1 is equally divided in light amount to the directions of the first optical system A and the second optical system B by the polarization beam splitter 3.

Figure 6:
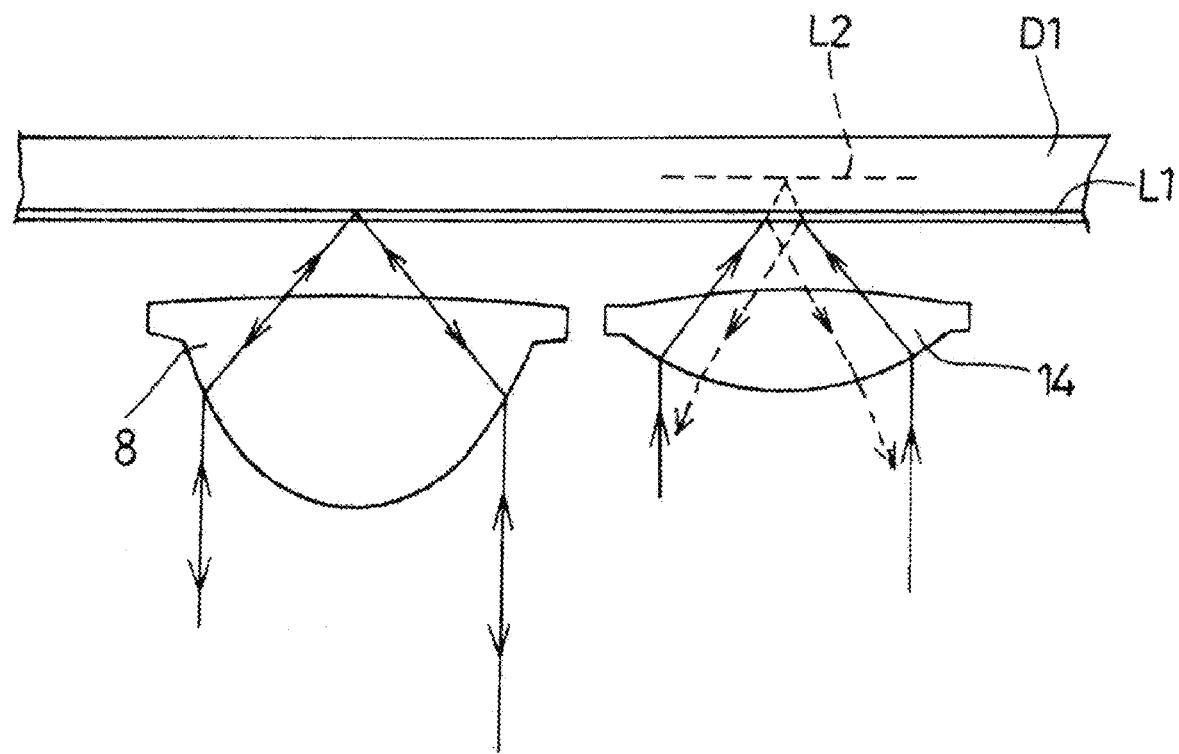
FIG. 6 is a diagram illustrating a relationship between an optical disc and laser light according to an embodiment of the present invention.

That is, when an operation of reproducing a signal recorded in the signal recording layer L1 included in the first optical disc D1 is performed through the focusing operation by the first objective lens 8, the laser light is also in a state of being incident on the second objective lens 14 included in the second optical system B. FIG. 6 is a diagram for explaining a focused state of the laser light by using the second objective lens 14 in a state where the operation of reproducing a signal recorded in the signal recording layer L1 included in the first optical disc D1 is performed through the focusing operation by the first objective lens 8.

As is obvious from the figure, a position on which the laser light is focused through the focusing operation with the second objective lens 14 in such a state is not the position of the signal recording layer L1 but the position of the signal recording layer L2 (illustrated by a broken line) included in the second optical disc D2, and thus, the focusing operation is not performed onto the signal recording layer L1. Therefore, the laser light applied to the first optical disc D1 through the second objective lens 14 is reflected by the signal recording layer L1 as illustrated by a broken line.

The laser light focused onto the signal recording layer L1 through the focusing operation of the first objective lens 8 is reflected by the signal recording layer L1 to enter the first objective lens 8, and the return light is emitted in the opposite direction through the same optical path as that of the laser light incident on the first objective lens 8 as illustrated by a solid line. In contrast to the laser light of the first optical system A, the laser light of the second optical system B reflected from the signal recording layer L1 enters the second objective lens 14 as shown, and the return light is emitted in the opposite direction through a optical path different from that of the laser light incident on the second objective lens 14 as shown by a broken line.

The return light emitted from the second objective lens 14 enters the anamorphic lens 15 through the second raising mirror 13, the third reflection mirror 12, the second collimating lens 11, the second reflection mirror 10, the second-optical system quarter-wave plate 9, and the polarization beam splitter 3 as mentioned above, to be applied to the sensor portion of the four-divided sensor, etc., included in the photodetector 16 through the focusing operation of the anamorphic lens 15.

However, since the return light of the second optical system B is greatly different from the optical path of the laser light applied to the signal recording layer L1 as shown, the light is not focused onto the sensor portion included in the photodetector 16 by the anamorphic lens 15. Therefore, even if the return light from the second optical system B is applied to the sensor portion included in the photodetector 16, a level of an obtained signal is negligibly small as compared with a level of a signal obtained through focusing of the return light from the first optical system A. As a result, the return light of the second optical system B does not adversely affect the operation of reproducing a signal recorded in the first optical disc D1 with the first optical system A, and the operation of reproducing a signal recorded in the first optical disc D1 can be performed without trouble.

Figure 7:
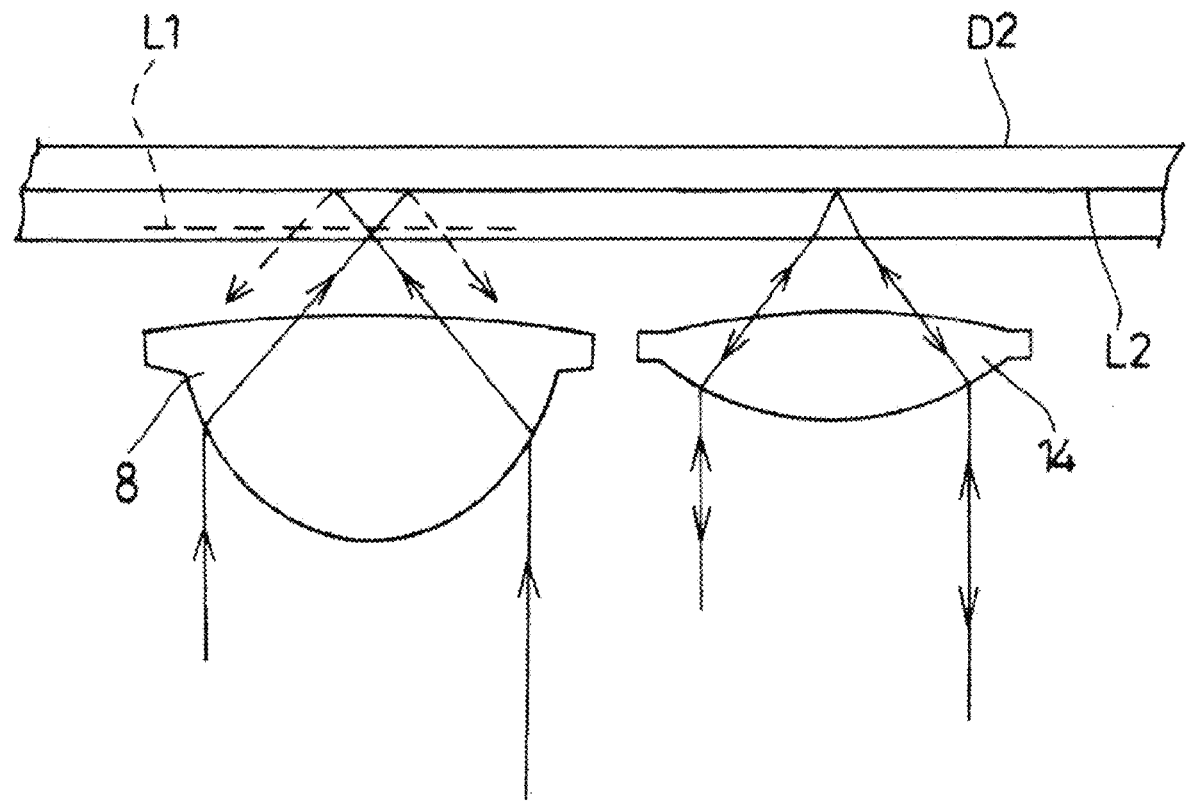
FIG. 7 is a diagram illustrating another relationship between an optical disc and laser light according to an embodiment of the present invention.

When the operation of reproducing a signal recorded in the signal recording layer L2 included in the second optical disc D2 is performed through the focusing operation by the second objective lens 14, the laser light is also in a state of being incident on the first objective lens 8 included in the first optical system A. FIG. 7 is a diagram for explaining a focused state of the laser light by using the first objective lens 8 in a state where the operation of reproducing a signal recorded in the signal recording layer L2 included in the second optical disc D2 is performed through the focusing operation by the second objective lens 14.

As is obvious from the figure, a position on which the laser light is focused through the focusing operation with the first objective lens 8 in such a state is not the position of the signal recording layer L2 but the position of the signal recording layer L1 (illustrated by a broken line) included in the first optical disc D1, and thus, the focusing operation is not performed onto the signal recording layer L2. Therefore, the laser light applied to the second optical disc D2 through the first objective lens 8 is reflected by the signal recording layer L2 as illustrated by a broken line.

The laser light focused onto the signal recording layer L2 through the focusing operation of the second objective lens 14 is reflected by the signal recording layer L2 to enter the second objective lens 14, and the return light is emitted in the opposite direction through the same optical path as that of the laser light incident on the second objective lens 14 as illustrated by a solid line. In contrast to the laser light of the second optical system B, the laser light of the first optical system A reflected from the signal recording layer L2 enters the first objective lens 8 as shown in the figure, and the return light is emitted in the opposite direction through the optical path different from that of the laser light incident on the first objective lens 8 as shown by a broken line.

The return light emitted from the first objective lens 8 enters the anamorphic lens 15 through the first raising mirror 7, the first reflection mirror 6, the first collimating lens 5, the first-optical system quarter-wave plate 4, and the polarization beam splitter 3 as mentioned above, to be applied to the sensor portion of the four-divided sensor, etc., included in the photodetector 16 through the focusing operation of the anamorphic lens 15.

However, since the return light of the first optical system A is greatly different from the optical path of the laser light applied to the signal recording layer L2 as shown, the light is not focused onto the sensor portion included in the photodetector 16 by the anamorphic lens 15. Therefore, even if the return light from the first optical system A is applied to the sensor portion included in the photodetector 16, a level of an obtained signal is negligibly small as compared with a level of a signal obtained through focusing of the return light from the second optical system B. As a result, the return light of the first optical system A does not adversely affect the operation of reproducing a signal recorded in the second optical disc D2 with the second optical system B, and the operation of reproducing a signal recorded in the second optical disc D2 can be performed without trouble.

The optical systems of the optical pickup apparatus according to an embodiment of the present invention is made up as mentioned above, and assembling of the optical pickup apparatus with the above configuration will hereinafter be described.

There is performed an assembling and adjusting operation by which optical components making up the optical pickup apparatus are bonded and fixed in mounting positions for optical components provided at a housing, and the first assembling and adjusting operation is performed for the second optical system B provided for the second optical disc D2.

That is, the assembling operation is performed through adjusting and fixing in optimal positions the laser diode 1, the diffraction grating 2, the polarization beam splitter 3, the second-optical system quarter-wave plate 9, the second reflection mirror 10, the second collimating lens 11, the third reflection mirror 12, the second raising mirror 13, the second objective lens 14, the anamorphic lens 15, and the photodetector 16.

When the optical components are bonded and fixed to the optimal positions with respect to the second optical system B by such a assembling and adjusting work, an applied spot to be formed by the return light being applied to the four-divided sensor portion included in the photodetector 16 becomes as shown in FIG. 4. That is, the main beam M, the sub beams S1 and S2, which are applied spots formed from the laser light that is the return light, are accurately positioned at the center portions on the main-beam light receiving portion MD, the sub-beam light receiving portions SD1 and SD2, respectively, and each beam is formed in a circular shape as a result of an accurate focus adjustment.

After the operations of adjusting and fixing the second optical system B and optical components acting on the second optical system B in the optimal position has been completed as described above, the assembling operation for the first optical system A provided for the first optical disc D1 is performed.

Such assembling operation is performed by adjusting and fixing in optimal positions the first-optical system quarter-wave plate 4, the first collimating lens 5, the first raising mirror 7, and the first objective lens 8, however, the fixing operation of the first reflection mirror 6 is performed later.

That is, the first reflection mirror 6 included in the first optical system A is made up so as to be able to perform an operation of adjusting the flap angle, and the flap angle of the first reflection mirror 6 is changed to be adjusted to perform an operation of adjusting phases of the main beam and the sub beams. Such an adjusting operation is performed by making an adjustment such that the main beam M and the sub beams S1 and S2 are respectively positioned at optimal positions on the main-beam light receiving portion MD and the sub-beam light receiving portions SD1 and SD2 included in the photodetector 16.

In a state where the main beam M and the sub beams S1 and S2 are positioned at the optimal positions on the main-beam light receiving portion MD and the sub-beam light receiving portions SD1 and SD2 by the above adjusting operation, an operation of bonding and fixing the first reflection mirror 6 is performed.

By performing the above-mentioned operations, the operation of fixing optical components making up the optical pickup apparatus is completed. Performance and quality of the optical pickup apparatus can be inspected such that the focus control operation for the first optical disc D1 and the focus control operation for the second optical disc D2 are alternately performed to conduct an inspection of a phase difference between the main beam M and the sub beams S1 and S2 applied to the main-beam light receiving portion MD and the sub-beam light receiving portions SD1 and SD2 included in the photodetector 16.

In the optical pickup apparatus including the two optical systems for the operations of reproducing signals recorded in the first optical disc D1 and the second optical disc D2 of standards different from each other as mentioned above, since the light amount of the laser light are equally divided by the dividing operation by the polarization beam splitter, there is no need to provide polarization control optical components for switching the laser light according to the optical disc in use, and thus, an inexpensive optical pickup apparatus can be provided.

In an embodiment of the present invention, a configuration may be made such that the S-polarized light is reflected from the polarization beam splitter 3 in the direction of the first optical system A, however, the linearly polarized light in the P direction may be reflected.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A method for assembling an optical pickup apparatus that comprises a first optical system for guiding a first laser light onto a signal recording layer of a first type of optical disc and a second optical system for guiding a second laser light onto a signal recording layer of a second type of optical disc, wherein the first optical system is comprised of a plurality of components including a reflection mirror, and the second optical system is comprised of a different plurality of components, the method comprising:

mounting the components that comprise the second optical system;

after mounting the components that comprise the second optical system, mounting the components that comprise the first optical system, except for the reflection mirror; and after mounting the components that comprise the first optical system, except for the reflection mirror, adjusting a flap angle of the reflection mirror, then mounting the reflection mirror at the adjusted flap angle.

2. The method of claim 1, wherein a thickness of a protective layer between a surface and the signal recording layer of the first type of optical disc is smaller than a thickness of a protective layer between a surface and the signal recording layer of the second type of optical disc.

3. The method of claim 1, wherein the optical pickup apparatus further comprises a diffraction grating and a polarization beam splitter, and the method further comprises:

outputting, by the diffraction grating, diffracted laser light as 0th order diffracted light and ±1 diffracted light;

dividing, by the polarization beam splitter, the diffracted laser light laser light into the first laser light for input to the first optical system and the second laser light for input to the second optical system.

4. The method of claim 3, wherein the first laser light and the second laser light are an equal percentage of the diffracted laser light.

5. The method of claim 3, wherein the optical pickup apparatus further comprises a photodetector, and wherein mounting the components that comprise the second optical system comprises:

adjusting the different plurality of components comprising the second optical system in order to apply returned second laser light reflected from the signal recording layer of the second type of optical disc to a four-divided sensor portion of the photodetector, wherein:

the returned second laser light corresponding to the 0th order diffracted light is applied as a circular shaped spot in the center of the sensor portion of a first light-receiving portion of the photodetector, and the returned second laser light corresponding to the ±1st order diffracted light is applied as a circular shaped spot in the center of the sensor portion of a second light-receiving portion of the photodetector.

6. The method of claim 5, wherein adjusting a flap angle of the reflection mirror comprises changing the flap angle of the reflection mirror in order to apply returned first laser light reflected from the signal recording layer of the first type of optical disc to the four-divided sensor portion of the photodetector, wherein:

the returned first laser light corresponding to the 0th order diffracted light is applied as a circular shaped spot in the center of the sensor portion of the first light-receiving portion of the photodetector, and the returned first laser light corresponding to the ±1st order diffracted light is applied as a circular shaped spot in the center of the sensor portion of the second light-receiving portion of the photodetector.

* * * * *

UNITED STATES PATENT AND TRADEMARK OFFICE
CERTIFICATE OF CORRECTION

PATENT NO. : 8,339,922 B2  
APPLICATION NO. : 12/371109  
DATED : December 25, 2012  
INVENTOR(S) : Tohru Hotta, Ryoichi Kawasaki and Tetsuhisa Hosokawa It is certified that error appears in the above-identified patent and that said Letters Patent is hereby corrected as shown below:

Column 14, Line 20 (Claim 3), after "laser light" delete "laser light".

Signed and Sealed this
Twelfth Day of March, 2013

Teresa Stanek Rea
*Acting Director of the United States Patent and Trademark Office*